United States Patent Office 2,837,437
Patented June 3, 1958

2,837,437

PRODUCTION OF THERMOPLASTIC MATERIALS

Donald Finlayson, Boleslaw Krzesinski, and Antoni Harcolinski, Spondon, near Derby, England, assignors to British Celanese Limited, a corporation of Great Britain No Drawing. Application May 12, 1953
Serial No. 354,660

Claims priority, application Great Britain May 29, 1952

9 Claims. (Cl. 106—198)

This invention relates to thermoplastic materials modified by means of colouring matters or other effect materials. It is especially concerned with the production of coloured cellulose acetate or other cellulose ester or ether.

Cellulose acetate powder containing colouring matter is useful for a variety of purposes, for example as a basis for moulding powders or for working up into sheets, rods, tubes or the like by extrusion processes. Again a powder of suitable particle size may readily be converted into filamentary products by the method described in U. S. Ser. No. 243,994, filed August 28, 1951. For such purposes a product made by simply mixing cellulose acetate powder of an appropriate particle size with a finely powdered colouring matter is satisfactory from many aspects. It has, however, the disadvantage that as a consequence of bulk transport, transfer from one recepticle to another, or other form of handling, there is often a tendency for the mixture to become non-uniform due to segregation of the particles of colouring matter from the particles of cellulose acetate which are usually the larger. This mechanical segregation is liable to occur, for example, during the feeding of the mixture to one of the filament-forming devices described in the above mentioned specification, with the result that the products are not of uniform color.

We have found that the difficulty can be overcome by heat treatment of the mixture of cellulose acetate powder and powdered colouring matter. The treatment temperature is preferably at least 150° C. but insufficiently high to cause any substantial fusing together of the particles of cellulose acetate. Heat treatment at a temperature within the range 190 to 210° C. is particularly effective for acetone-soluble cellulose acetates.

Very valuable results can be obtained when the colouring matter is one which is free from sulphonic, acid sulphuric ester, and carboxyl groups and is capable of dyeing cellulose acetate to at least a small extent when presented to the cellulose acetate in the form of an aqueous dispersion at a temperature below 100° C. The effect of the heat treatment is then to cause the colouring matter to be absorbed by the cellulose acetate in much the same way that the colouring matter would be taken up by the cellulose acetate from an aqueous dispersion and with much the same result. The product comprises particles of coloured cellulose acetate rather than a mixture of cellulose acetate particles and colouring matter particles as is the case before the heat treatment and there is no longer any substantial tendency for colouring matter to separate from cellulose acetate during manipulation of the powder as when feeding it to one of the filament-forming devices of the above mentioned specification.

As mentioned in U. S. Ser. No. 243,994, filed August 28, 1951, and U. S. Ser. No. 304,441, filed August 14, 1952, now abandoned, powdered cellulose acetates which have been suitably heat-treated are more readily processed into filamentary products by the process of the first mentioned specification than cellulose acetate powders which have not been heat-treated. The heat-treatment of the present invention likewise facilitates the production of filamentary products from the mixture of cellulose acetate and colouring matter.

The heat-treatment of the mixture of cellulose acetate powder and colouring matter may be effected under the conditions described for heat-treatment of cellulose acetate in U. S. Ser. No. 304,441, filed August 14, 1952. Thus, in the case of acetone-soluble cellulose acetate, the heat-treatment may be at temperatures of 180 to 220° C. and, as indicated above, especially at temperatures of 190 to 210° C. The duration of heating may be from 5 or 10 minutes to 30 minutes or more. A very effective colouration of cellulose acetate powder with a colouring matter of the kind hereinbefore indicated may be obtained by heating a mixture of the cellulose acetate powder and colouring matter powder for 20 to 30 minutes at a temperature of 200° C.

The heating may be effected in air or in an inert gas for example nitrogen. The powder should preferably be loose during the heating; if it is pressed together there is risk of substantial coalescence of the particles of cellulose acetate. The heating is preferably effected while the material is in the form of thin layers of say $\frac{1}{8}$ to $\frac{1}{4}$ or $\frac{1}{2}$ in. thick. The material is advantageously stirred or otherwise agitated occasionally during heating or it may be agitated throughout the heating.

As indicated above, particularly useful results are obtainable when the colouring matter is one which is free from sulphonic, acid sulphuric ester, and carboxyl groups and, in the form of an aqueous dispersion, is capable of colouring cellulose acetate to at least a small extent at a temperature below 100° C. Such colouring matters may be, for example of the azo, aminoanthraquinone, or nitro-aromatic-amine series (e. g. the nitro-diarylamine series). The colouring matter is preferably one which does not volatilise to any substantial extent during the heat treatment of the material. Examples of such colouring matters are the azo dye from diazotised para-aminoacetoanilide and para-phenylphenol (yellow), 1 - amino-4-phenylaminoanthraquinone (violet-blue), 1-amino-4-hydroxy-anthraquinone (bluish-red), 1 - amino - 4 - acetyl-amino-anthraquinone (bluish-red), 1 - amino-4-phenylamino - anthraquinone-2-carboxylic - hydroxyethylamide (blue), 2-nitro-diphenylamine-4-sulphonamide (yellow), 2 - nitro-4'-ethoxy - diphenylamine-4-sulphonamide (reddish - yellow), and 4:4'-diamino-3:3'-dinitro - diphenylmethane (pure yellow).

The following is an example of the production of a coloured cellulose acetate powder in accordance with the invention.

*Example*

Cellulose acetate powder (acetone-soluble and of acetyl value 53.2% calculated as acetic acid) ground to pass a 40 meshes per inch sieve is ball-milled for a few minutes with 1% of its weight of 1-amino-4-phenylaminoanthraquinone. The mixture is spread in layers of about $\frac{1}{4}$ inch thickness on shelves in an oven and is heated to a temperature of 200° C. for 20 to 30 minutes. The powder is occasionally stirred during this treatment, for example, by raking. The resulting product consists of particles of cellulose acetate coloured in a violet-blue shade with the 1-amino-4-phenylaminoanthraquinone. The product is very suitable for processing into filaments by the methods described in U. S. Ser. No. 243,994, filed August 28, 1951.

Other of the dyes specified above or mixtures thereof may be substituted for the 1-amino-4-phenylaminoanthraquinone. Again, the cellulose acetate specified may be replaced by a cellulose acetate of acetyl value about 61.5% (calculated as acetic acid), the heating being then carried out at 160 to 170° C. for 30 to 45 minutes.

The invention is not limited to the use of colouring matters capable of colouring cellulose acetate when presented thereto as aqueous dispersions at temperatures below 100° C. Thus, colouring matters of other types may be employed or indeed uncoloured substances adapted to modify the appearance of cellulose acetate products, for example titanium dioxide or other white pigment. In such cases the effect of the heat treatment is to reduce or prevent segregation of pigment and cellulose acetate during subsequent handling operations and particularly during conversion of the products into filamentary materials by the methods of U. S. Ser. No. 243,994, filed August 28, 1951. Examples of such other colouring matters and effect materials are as follows:

(1) White inorganic pigments, for example titanium dioxide or barium sulphate.

(2) Coloured inorganic pigments, for example Prussian blue, ultramarine, chrome yellow or ferric oxide, including commercial products such as Turkey Red Oxide 5RS (I. C. I.).

(3) Coloured organic pigments: (a) Vat colouring matters, for example indanthrone and its halogen derivatives, flavanthrone, dibenzanthrone and its halogen and alkoxy derivatives, e. g. the well known dimethoxy-dibenzanthrone, and anthraquinone carbazoles. Commercial dyes of this group which may be employed are Caledon Blue RN (I. C. I.), Paradone Yellow G (L. B. Holliday), Caledon Brown G (I. C. I.), Caledon Brilliant Red 3B (I. C. I.). (b) Azo pigments, for example the water-insoluble azo dyes from diazo compounds (free from salt forming groups) and beta-naphthol, acylaceticarylamides and arylamides of 2:3-hydroxy-naphthoic acid or ortho-hydroxy-carboxylic acids of the anthracene, carbazole, and di-phenyl oxide series. Examples of such dyes are those from diazotised para-nitraniline or 2-nitro-4-methyl-aniline and beta-naphthol, that from diazotised 2-nitro-4-methyl-aniline and acetoacetic-anilide, that from diazotised aminoazotoluene and the 2:5-dimethoxy-anilide of 3-hydroxy-2-carboxy-diphenylene oxide and that from diazotised 3-nitro-4-amino-anisole and the o-anisidide of 2:3-hydroxy-naphthoic acid. Commercial dyes of this class are Monolite Fast Reds 2RS and 4RH and Monolite Fast Yellow GTS. (c) Phthalocyanine pigments, for example, phthalocyanine free from metal and copper phthalocyanine and its halogen derivatives.

(4) Water-soluble dyes, for example acid wool dyes.

The method described above involves heating the particles of the cellulose acetate powder in intimate mixture with the solid colouring matter or other effect material. Specifically, the dry powdered cellulose acetate is mixed with the dry powdered colouring matter. Other methods of forming the intimate mixture of cellulose acetate powder and effect material may however be employed. For example the cellulose acetate powder may be mixed with the effect material in the presence of a liquid which dissolves neither and the mixture dried at a temperature below 130° C. prior to heating in accordance with the invention. Thus the cellulose acetate may be mixed with an aqueous paste or flowable suspension of a water-insoluble effect material and the mixture dried and heated. Again, the cellulose acetate may be mixed with an aqueous or other solution of a colouring matter such that the latter is not taken up by the cellulose acetate and the mixture dried and the resulting particles of cellulose acetate, now intimately associated with colouring matter, heated as described above. It appears that on heating the powders in accordance with the process of the invention the effect material adheres to the cellulose acetate particles so that it can no longer be segregated therefrom mechanically; in the case of colouring matters having affinity for cellulose acetate the colour appears to penetrate each particle of cellulose acetate and colour it more or less uniformly.

The invention is not restricted to the production of cellulose acetate powders containing effect materials. It may be applied to the production of powders of other cellulose esters of organic acids or of cellulose ethers and indeed to the production of powders of thermoplastic materials generally, the said powders containing effect materials. Examples of such other cellulose esters and ethers are cellulose propionate, cellulose acetate-propionate, cellulose acetate-butyrate, ethyl cellulose and benzyl cellulose. For the preparation of powders of thermoplastic materials other than cellulose esters or ethers the thermoplastic materials may be thermoplastic condensation polymers, for example polymers obtainable by condensing diamines with dicarboxylic acids, e. g. the well known nylon 66; again they may be addition polymers such as those obtainable by addition polymerisation of vinyl compounds or mixtures thereof, e. g. polyvinyl chloride, polystyrene, or polymethyl-methacrylate. In the case of all the thermoplastic materials treated in accordance with the invention the heating temperature should be sufficiently high to render mechanical segregation of effect material from the thermoplastic material difficult, but insufficiently high to cause any substantial fusing together of the particles of the material. In general the minimum temperature desirable is 120° C.

Thus coloured powders may be obtained by applying the procedure described in the example given in connection with cellulose acetate to powders of the following materials but using the heating times and temperatures indicated.

| Material | Temperature, °C. | Time (minutes) |
| --- | --- | --- |
| cellulose propionate | 150–160 | 30–45 |
| cellulose acetate-propionate | 150–160 | 30–45 |
| cellulose acetate-butyrate | 150–160 | 30–45 |
| ethyl cellulose | 140–150 | 30–45 |
| nylon 66 | 180–190 | 30–45 |
| polyvinyl chloride (Corvic 44) | 120–135 | 20–30 |
| polystyrene | 130–140 | 20–30 |

The cellulose propionate mentioned above has a propionyl value of 66.7% (calculated as propionic acid). The cellulose aceto-propionate has an acetyl value of 25.6% and a propionyl value of 39% (both calculated as the acid). The cellulose acetate-butyrate has an acetyl value of 31.3% and a butyryl value of 15.4% (both calculated as the acid). The ethyl cellulose has an ethoxy content of 45%.

Having described our invention what we desire to secure by Letters Patent is:

1. Method of preparing a powder of thermoplastic material infusible below 120° C., the particles of said powder being bonded to an effect material selected from the group consisting of pigments and dyes, which consists in heating a product consisting solely of a loose intimate mixture of thermoplastic material in the dry powdered state with the effect material also in the dry powdered state in thin layers with agitation to a temperature of at least 120° C. and at most 220° C. but insufficiently high to cause any substantial fusing together of the particles of thermoplastic material, the heating being continued until mechanical segregation of thermoplastic material and effect material is no longer possible.

2. Process according to claim 1, wherein the effect material is a coloured pigment.

3. Process according to claim 1, wherein the effect material is a white pigment.

4. Method of preparing a powder of a cellulose ester of a fatty acid containing from two to four carbon atoms, which cellulose ester is infusible below 150° C., the particles of said powder being bonded to an effect material selected from the group consisting of pigments and dyes, which consists in heating a product consisting solely of a loose intimate mixture of the cellulose ester in the dry powdered state with the effect material also in the dry powdered state in thin layers with agitation to a temperature of at least 150° C. and at most 220° C. but insufficiently high to cause any substantial fusing together of the particles of the cellulose ester, the heating being continued until mechanical segregation of the cellulose ester and effect material is no longer possible.

5. Process according to claim 4, wherein the effect material is a coloured pigment.

6. Process according to claim 4, wherein the effect material is a white pigment.

7. Method of preparing a powder of acetone-soluble cellulose acetate, the particles of said powder being bonded to an effect material selected from the group consisting of pigments and dyes, which consists in heating a product consisting solely of a loose intimate mixture of the cellulose acetate in the dry powdered state with the effect material also in the dry powdered state in thin layers with agitation to a temperature of 180°–220° C., the heating being continued until mechanical segregation of cellulose acetate and effect material is no longer possible.

8. Process according to claim 7, wherein the heating temperature is 190 to 210° C. and the duration of heating is from 10 to 30 minutes.

9. Process according to claim 7, wherein the effect material is a colouring matter which is free from sulphonic, acid sulphuric ester, and carboxyl groups and, in the form of an aqueous dispersion, is capable of colouring the cellulose acetate at a temperature below 100° C.

References Cited in the file of this patent

UNITED STATES PATENTS

| | | |
|---|---|---|
| 1,971,398 | Fausten | Aug. 28, 1934 |
| 2,080,254 | Dreyfus | May 11, 1937 |
| 2,369,506 | Weibel | Feb. 13, 1945 |
| 2,447,398 | Supminski | Aug. 17, 1948 |
| 2,465,915 | Myles | Mar. 29, 1949 |
| 2,477,009 | Sandler | July 26, 1949 |
| 2,497,346 | Collins | Feb. 14, 1950 |
| 2,591,077 | Lamborn | Apr. 1, 1952 |

FOREIGN PATENTS

| | | |
|---|---|---|
| 389,876 | Great Britain | Mar. 30, 1933 |
| 435,311 | Great Britain | Sept. 19, 1935 |

OTHER REFERENCES

Hill: "Am. Dyestuff Report" Nov. 15, 1937, pp. 711–3.